June 13, 1961 F. SCHNEIDER 2,987,972
HYDRAULIC VISE
Filed July 3, 1958
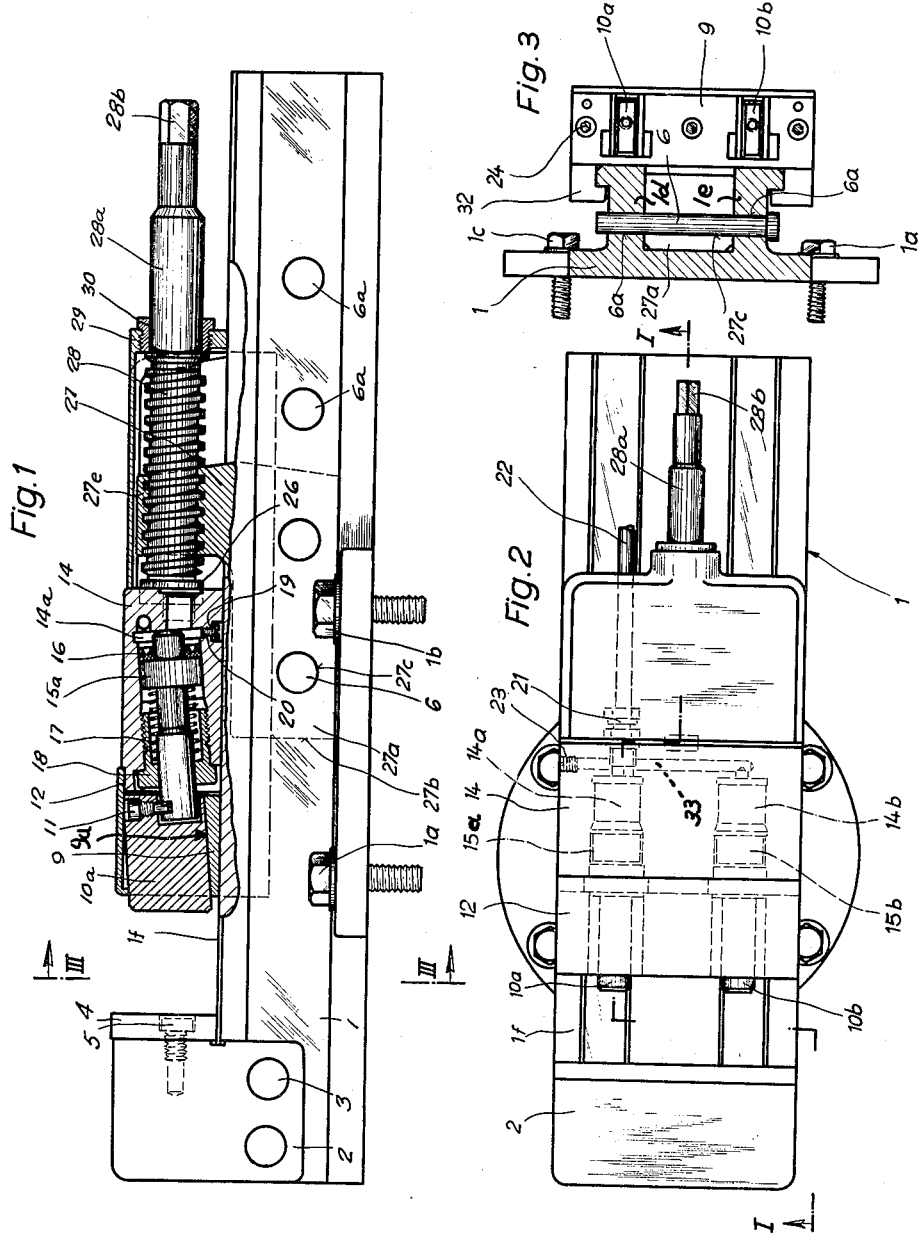
INVENTOR.
Fritz Schneider
BY
Patent Agent

United States Patent Office 2,987,972
Patented June 13, 1961

2,987,972
HYDRAULIC VISE
Fritz Schneider, Hilchenbach, Germany, assignor to Maschinenfabrik Hilma G.m.b.H., Hilchenbach, Germany
Filed July 3, 1958, Ser. No. 746,558
Claims priority, application Germany Sept. 12, 1957
8 Claims. (Cl. 90—60)

The present invention relates to a hydraulic quick clamping device for clamping work pieces on milling, planing, grinding, drilling and similar machine tools and may be employed wherever parts have to be held in clamped position.

Clamping devices are known which are equipped with a mechanical coarse adjustment and in which one contact jaw is stationary whereas the other contact jaw is movable and adjustable, for instance by means of a threaded spindle. Such vises are also equipped with a hydraulic adjusting mechanism and are employed preferably in connection with the manufacture of individual parts and also in connection with the construction of jigs and machine tools.

However, in connection with mass production, especially when short machining times are involved, these heretofore known clamping devices require too much handling and adjusting time.

Also compressed air actuated clamping means, i.e. vises operable by compressed air are known. These constructions, however, have the drawback of being unduly big and of being unable to produce high clamping pressures.

Furthermore, vises have been suggested which are equipped with oil hydraulics and by means of compressed air are actuated through the intervention of a pressure transmission. These heretofore known vises have the same drawback as the heretofore known vises used on machines. The last mentioned vises are equipped with guiding means for guiding the jaws parallel to each other so that non-parallel or slightly cone or irregularly-shaped work pieces can frequently be clamped along two points only which, however, does not suffice when the machining of a piece on a machine tool is involved. In such instances, shims or the like have to be inserted. While this additional operation may still be tolerable when the manufacture of individual parts is involved, it is not at all suitable for mass production due to a considerable loss in time. It is, of course, possible to form specific jaws designed in conformity with the specific contour of the work piece to be clamped, however, this would require considerable additional costs and a considerable loss in time and, therefore, would be unsuitable.

It is, therefore, an object of the present invention to provide a clamping device of the general type involved, which will overcome the above mentioned drawbacks.

It is another object of this invention to provide a clamping device, in which the jaws will adapt themselves to the contour of the work piece during the clamping operation of the vise, and in which the pressure conveying means which engage the work piece will clamp the latter at least at three points.

These and other objects and advantages of the invention will appear more clearly from the following specification in connection with the accompanying drawings, in which:

FIG. 1 is a side view partly in section of a vise according to the present invention, said section being taken along the line I—I of FIG. 2.

FIG. 2 is a top view of the arrangement according to FIG. 1.

FIG. 3 represents a cross section taken along the line III—III of FIG. 1.

General arrangement

The vise according to the present invention is characterized primarily in that two or more hydraulically actuated pressure members are arranged within one jaw. In this connection, for speeding up the operation of the device, two or more hydraulically actuated pressure members may be arranged within one jaw. In this connection, it may be advantageous for purposes of obtaining a quick actuation to employ compressed air for actuating the hydraulic mechanism through the intervention of a pressure transmission. By arranging two or more pressure members which are acted upon simultaneously, these pressure members will during the clamping operation adapt themselves to the shape of the work piece so that a pressure equalization will occur with the result that the work piece will at any rate be clamped at at least three points. The pressure members may along a horizontal plane or along an inclined plane be moved toward the clamping position, i.e. be moved toward a stationary clamping jaw if such stationary clamping jaw should be employed. Preferably, the pressure members are displaceably arranged on a downwardly inclined plane extending in the direction of the clamping station so that the work piece while being clamped will be pressed downwardly against the supporting surface which defines, in the downward direction, the space between the pressure members and the stationary clamping jaw. In this way, a further drawback of the heretofore known vises will be avoided namely that the movable jaw and together with the latter also the work piece will be pressed upwardly during the clamping operation. According to a further embodiment of the invention, the spindle nut is displaceable on the lower vise portion and may be arrested by a plug bolt or the like. The spindle nut acts upon the slide or carriage which comprises the cylinders receiving the pressure member pistons, so that said spindle nut coarsely adjusts the pressure members. The said lower portion may have whatever desired length is required so that a clamping device with practically non-limited clamping width will be obtained.

By means of the clamping device according to the invention, it is also possible to clamp big work pieces or long bar sections by means of devices arranged in rows alongside each other. Thus, it is also possible to clamp rough forged or cast pieces with irregular dimensions and rough surfaces. In such instances, a plurality of clamping means may be actuated simultaneously by means of a single correspondingly large pressure transmitter and may be actuated simultaneously.

Also the stationary jaw of the clamping device may in the same manner as described above be movably and adjustably designed. It may be rotatable by about 180° about its vertical axis and may be inserted with the clamping surface toward the rear. Furthermore, it is possible in addition to the rear normally stationary jaw, to place the front movable hydraulic jaw in inverse manner upon the lower portion so that both jaws will have their clamping surfaces located on the outside. When the clamping jaws are so adjusted prior to mounting the work piece, hollow bodies, cast casings etc. may in this way with an open side directed downwardly be placed upon the clamping device and be clamped outwardly from the inside. This application is naturally also possible when clamping a row of elements.

Inasmuch as with most organizations, compressed air is available, the oil hydraulics are preferably actuated through the intervention of a pressure transmitter. It is a matter of course that instead also a motor pump or a manually operated screw pump or the like may be employed for producing the necessary pressure.

Structural arrangement

Referring now to the drawing in detail, the lower part or bed of the clamping device may be of any desired length and may be of U-shaped cross section in conformity with the showing of FIG. 3. Bed 1, which may be connected by screws 1a, 1b, 1c to any desired support, has the stationary jaw 2 connected thereto by means of an insertable bolt 3. The stationary jaw 2 may be equipped with an exchangeable contacting plate 4 which is connected to the stationary jaw proper by means of screws 5.

The clamping device shown in the drawing furthermore includes an adjustable jaw 9 which has associated therewith a spindle nut 27. The nut 27 has an extension 27a extending between the legs 1d and 1e of bed 1. The extension 27a is connected to bed 1 by means of an insertable bolt 6. Extension 27a forms with nut 27 an angular member the front edge 27b, when looking toward the clamping jaw 2, being located closer to the latter than the spindle nut 27. Extension 27a is provided with a bore 27c which is located as far as possible ahead of bore 27e of the spindle nut. Legs 1d and 1e of bed 1 have a plurality of pairs of transverse bores 6a spaced from each other in longitudinal direction of the device. Depending on the desired clamping range, the insertable bolt 6 will be inserted through the respective pair of transverse bores. Spindle nut 27 is engaged by a spindle 28 which is covered by a hood or cover 29 and in addition to the thread meshing with spindle nut 27 also has a threadless section 28a which is journalled and guided in a bearing 30. That rear end 28b of spindle 28 which protrudes from the hood 29 may be equipped with a hexagonal or other polygonal head for receiving a corresponding crank lever. The front end of spindle 28 acts upon a slide 14 the front end of which is connected to jaw 9 by means of screws 24, said slide being guided on bed 1 by means of guiding members or bars 32.

According to the present invention, jaw 9 has arranged therein, for instance two pressure members 10a and 10b which are adapted for clamping purposes to act upon the work piece. These pressure members 10a, 10b are preferably guided on an inclined jaw surface 9a which descends in the direction toward the stationary jaw 2 so that the work piece to be clamped will during a clamping operation be pressed upon surface 1f of bed 1.

Behind each pressure member 10a, 10b, slide 14 has a cylindrical chamber 14a and 14b respectively with a piston 15a and 15b respectively slidably movable therein. The pistons are additionally guided in bushings 18 which are screwed into slide 14. The pistons 15a, 15b are sealed by a seal 16. Pressure springs 17 are interposed between the pistons 15a, 15b and the bushings 18. The pistons 15a, 15b and the respective pressure members 10a, 10b are interconnected by means of screws 11. Jaw 9 is covered by a lid 12. An oil pressure conduit 22 communicates through the intervention of a nipple 21 with a bore 33 which in its turn communicates with the cylindrical chambers 14a, 14b in slide 14. The outer end of bore 33 is closed by means of a stopper 23. The cylindrical chambers 14a, 14b are furthermore provided with venting screws 20 which are screwed into slide 14 while engaging a seal 19 (FIG. 1).

Operation

When clamping a work piece into a device according to the present invention, the threaded spindle 28 is in customary manner turned so that the movable clamping jaw with the built-in pressure members 10a, 10b is moved close to the work piece to such an extent that a distance of a few millimeters will remain between the clamping jaw 9 and the work piece to be clamped. It is a matter of course that prior thereto the entire jaw 9 including the spindle was moved into a proper distance from the work piece and held in this position by the insertable bolt 6. After the movable jaw 9 by means of the threaded spindle 28 has been adjusted in the desired manner, when employing a pressure transmitter, the compressed air valve is opened manually or in any other desired manner. The compressed air will then act upon the low pressure piston of the pressure transmitter and will move the same forwardly by means of the respective hydraulically operable piston. In this way, the pressure will be conveyed from the hydraulic cylinders of the pressure transmitter to the respective pistons 15a and 15b of the clamping device so that these pistons will press the pressure members 10a, 10b against the work piece while also major differences in dimensions in the shape of the work piece will be compensated for. Due to the inclined surfaces 9a, the pressure members and thereby the work piece are pressed downwardly upon the support for the clamping device.

It is, of course, to be understood that the present invention is, by no means, limited to the particular construction shown in the drawing but also comprises any modifications within the scope of the appended claims.

As mentioned above, bolt 3 may be removed and jaw 2 may be turned by 180° and again secured to bed 1 by placing bolt 3 through bore 2a of jaw 2. Similarly, jaw 9 with nut 27 may be turned by 180° after removal of bolt 6 and may then again be secured to bed 1 by re-inserting bolt 6.

What I claim is:

1. In a vise: a bed, a first jaw connected to said bed, a second jaw movably mounted on said bed, mechanical means operatively connected to said second jaw and operable to displace the latter relative to said first jaw for selectively clamping a work piece therebetween, one of said jaws being provided with a plurality of passages extending in longitudinal direction of said vise and inclined downwardly in a direction toward the other jaw, a plurality of pressure members slidably mounted in said passages and movable selectively toward and into clamping cooperation with said other jaw, pressure fluid operable cylinder piston means associated with said one jaw and operable to move said pressure members toward and into clamping cooperation with said other jaw, and means for supplying fluid under pressure to said cylinder piston means from externally of said vise.

2. In a vise: a bed, a first jaw connected to said bed, a second jaw supported and movably mounted on said bed, a threaded nut adjustably mounted on and connectable to said bed, a threaded spindle threadedly engaging said nut and movably connected to said second jaw for displacing the latter relative to said first jaw, said nut having an extension extending into said bed and being provided with a bore transverse to the longitudinal direction of said bed and located at a level lower than that of said threaded spindle, said bed being provided with a plurality of transverse bores spaced from each other in longitudinal direction of said bed and at the same level as the transverse bore of said extension, an insertable bolt adapted selectively to be passed through any of the transverse bores of said bed and the transverse bore of said extension for selectively securing said nut in any of a plurality of positions with regard to said bed, said second jaw having spaced fluid operable members therein inclined downwardly toward the first jaw, and means for supplying and exhausting fluid from said fluid operable members from externally of said vise.

3. In a vise: a bed having a U-shaped cross section, a slide movably mounted on the top surface of said bed and having lateral extensions in guiding engagement with the outside of the legs of said U-shaped cross section of said bed, a first jaw connected to said bed, a second jaw supported by and connected to said slide, a nut member adjustably mounted on and connectable to said bed, said nut member having a threaded portion arranged at a level higher than the adjacent top surface of said bed, a threaded spindle threadedly engaging said threaded portion and movably connected to said second jaw for displacing the latter relative to said first jaw, said nut member also having an extension extending between the legs of the U-shaped cross section of said bed and being provided with a transverse bore arranged in a vertical plane ahead of said threaded portion when looking in the direction of movement of said second jaw toward said first jaw, said bed being provided with a plurality of transverse bores spaced from each other in longitudinal direction of said bed and at the same level as the transverse bore of said extension, an insertable bolt adapted selectively to be passed through any of the transverse bores of said bed and the transverse bore of said extension for selectively securing said nut in any of a plurality of positions with regard to said bed, members carried by said second jaw inclined downwardly toward the first jaw, piston cylinder means in the second jaw connected with said members, a conduit leading from outside the vise to said piston cylinder means, and spring means urging said members away from said first jaw.

4. A vise according to claim 3, in which the bed portion receiving said first jaw is provided with a bore, and in which the first jaw is provided with passage means adapted to register with said bore for receiving a bolt in said bore and said passage means to thereby detachably connecting said first jaw to said bed.

5. A vise according to claim 3, in which the bed portion receiving said first jaw is provided with a bore, and in which said first jaw is provided with two transverse bores spaced from each other in longitudinal direction of said bed and adapted selectively to register with the bore in said bed portion in two different positions of said first jaw which are spaced from each other by substantially 180°.

6. A vise according to claim 3, in which said nut member with said spindle and said slide and the parts supported by the latter are mountable on and relative to said bed in two different positions spaced from each other by substantially 180°.

7. A high speed hydraulic clamping arrangement for clamping workpieces thereinto, which comprises a base, a first jaw member stationary on the base, a second jaw member movable in the base relatively with respect to said first jaw member, a mechanically operable rough adjustment means for said relatively movable jaw member, and a hydraulically operable fine adjustment means for said relatively movable jaw member, said hydraulically operable means comprising at least two hydraulically operated pressure members arranged in said movable jaw member, said pressure members being inclined downwardly in the direction of said first jaw member, and means for supplying fluid to and exhausting actuating fluid from said pressure members from externally of said clamping arrangement.

8. An arrangement according to claim 7 wherein said first jaw member and said second jaw member are each rotatable through an angle of 180° on the base into two operative positions.

References Cited in the file of this patent

UNITED STATES PATENTS

| | | |
|---|---|---|
| 419,885 | Richards | Jan. 21, 1890 |
| 1,370,683 | Deater | Mar. 8, 1921 |
| 1,453,176 | Perrine | Apr. 24, 1923 |
| 2,176,608 | Marsilius | Oct. 17, 1939 |
| 2,430,366 | Porterfield | Nov. 4, 1947 |
| 2,472,083 | Bartholdy | June 7, 1949 |
| 2,584,062 | Stone | Jan. 29, 1952 |
| 2,708,382 | Olson | May 17, 1955 |
| 2,882,771 | Blazek | Apr. 21, 1959 |

FOREIGN PATENTS

| | | |
|---|---|---|
| 563,735 | Great Britain | Aug. 28, 1944 |